(12) United States Patent
Cardenas et al.

(10) Patent No.: US 10,549,386 B2
(45) Date of Patent: Feb. 4, 2020

(54) METHOD FOR ABLATING OPENINGS IN UNSUPPORTED LAYERS

(71) Applicant: XEROX CORPORATION, Norwalk, CT (US)

(72) Inventors: Ruander Cardenas, Wilsonville, OR (US); John R. Andrews, Fairport, NY (US)

(73) Assignee: XEROX CORPORATION, Norwalk, CT (US)

( * ) Notice: Subject to any disclaimer, the term of this patent is extended or adjusted under 35 U.S.C. 154(b) by 629 days.

(21) Appl. No.: 15/055,943

(22) Filed: Feb. 29, 2016

(65) Prior Publication Data
US 2017/0246769 A1     Aug. 31, 2017

(51) Int. Cl.
*B29C 35/08*     (2006.01)
*B23K 26/402*    (2014.01)

(52) U.S. Cl.
CPC .................. *B23K 26/402* (2013.01)

(58) Field of Classification Search
CPC .. B29C 35/0805; B23K 26/36; B23K 26/361; B23K 26/364; B23K 26/38; B23K 26/402; B23K 26/50; B23K 26/53
USPC ........................................................ 264/400
See application file for complete search history.

(56) References Cited

U.S. PATENT DOCUMENTS

| | | | | |
|---|---|---|---|---|
| 4,780,177 A * | 10/1988 | Wojnarowski | ........ | G03F 7/2006 134/3 |
| 5,368,900 A * | 11/1994 | Jelley | ..................... | G02B 6/122 216/24 |
| 5,539,175 A * | 7/1996 | Smith | .................. | B23K 26/073 219/121.7 |
| 6,034,349 A * | 3/2000 | Ota | ....................... | B23K 26/067 219/121.68 |
| 6,623,103 B2 * | 9/2003 | Maher | ........................ | B41J 2/16 219/121.71 |
| 6,777,170 B1 * | 8/2004 | Bloomstein | ........... | G03F 7/0037 264/401 |
| 6,838,038 B2 * | 1/2005 | Lovell | ..................... | B23K 26/38 264/400 |
| 7,302,309 B2 * | 11/2007 | Scott | ...................... | B41J 2/1603 219/121.6 |
| 7,494,900 B2 * | 2/2009 | Harris | ..................... | B23K 26/04 438/460 |
| 7,700,032 B1 * | 4/2010 | Lu | ........................ | B23K 26/147 264/400 |
| 8,048,473 B2 * | 11/2011 | Yamazaki | ........... | H01L 27/1288 216/13 |

(Continued)

*Primary Examiner* — Nahida Sultana
(74) *Attorney, Agent, or Firm* — Miller Nash Graham & Dunn LLP

(57) ABSTRACT

A method of forming openings in a polymer layer includes positioning a layer of a material over a cavity such that a portion of the first material lies over a cavity, ablating the portion of the material at a first shape, and ablating the portion of the material at a second shape, wherein the second shape lies within the first shape. A method of forming openings in a polymer layer includes positioning a layer of a first material over a second material having a cavity such that a portion of the first material lies over the cavity, ablating the portion of the first material over the cavity at a first shape, and ablating the portion of the second material over the cavity at a second shape, wherein the second shape lies within the first shape.

13 Claims, 5 Drawing Sheets

(56) References Cited

U.S. PATENT DOCUMENTS

| | | | | |
|---|---|---|---|---|
| 8,614,032 B2* | 12/2013 | Yoon | ................ | G03F 1/50 |
| | | | | 264/1.37 |
| 2002/0149136 A1* | 10/2002 | Baird | ................ | B23K 26/083 |
| | | | | 264/400 |
| 2004/0239006 A1* | 12/2004 | Hong | ................ | B81C 1/0046 |
| | | | | 264/400 |
| 2008/0314871 A1* | 12/2008 | Toth | ................ | B81C 1/00531 |
| | | | | 216/48 |
| 2010/0040830 A1* | 2/2010 | Bruenahl | ................ | B41J 2/162 |
| | | | | 428/131 |
| 2012/0009511 A1* | 1/2012 | Dmitriev | ................ | G03F 1/72 |
| | | | | 430/5 |
| 2012/0024471 A1* | 2/2012 | Goin | ................ | B41J 2/1433 |
| | | | | 156/272.8 |
| 2012/0168412 A1* | 7/2012 | Hooper | ................ | B23K 26/70 |
| | | | | 219/121.69 |
| 2012/0200007 A1* | 8/2012 | Straw | ................ | B23K 26/0661 |
| | | | | 264/400 |
| 2012/0295066 A1* | 11/2012 | Nukaga | ................ | C03C 23/0025 |
| | | | | 428/156 |
| 2013/0037992 A1* | 2/2013 | Milshtein | ................ | B23K 26/0608 |
| | | | | 264/400 |
| 2015/0072479 A1* | 3/2015 | Dias | ................ | H01L 21/56 |
| | | | | 438/127 |
| 2015/0230341 A1* | 8/2015 | Milne | ................ | H05K 3/0073 |
| | | | | 264/400 |
| 2016/0129526 A1* | 5/2016 | Russ | ................ | B23K 26/0869 |
| | | | | 264/400 |
| 2018/0037489 A1* | 2/2018 | Ono | ................ | B23K 26/382 |

* cited by examiner

METHOD FOR ABLATING OPENINGS IN UNSUPPORTED LAYERS

FIELD OF THE INVENTION

This disclosure relates to methods of manufacturing structures with lasers, more particularly methods of ablating openings in unsupported layers of material.

BACKGROUND

Printing and manufacturing equipment may employ micro-fluidic structures to route material to a surface or to form structures. For example, jet stacks used in printing typically consist of a stack of thin metal plates stacked together. Each plate has openings that mate with other openings in other plates to form channels, manifolds and other fluidic structures to route ink from one side of the jet stack to a nozzle plate. The nozzle plate has an array of apertures that allow the ink to selectively jet onto a surface.

Recently, some jet stacks have introduced polymer or other layers into the stack, either as adhesive layers or to replace one or more of the metal plates. These layers will also contain openings, typically made by a laser at some point in the manufacturing of the jet stack. In some instances, the opening to be etched in the polymer layer lies over a void or cavity in the stack below the layer. This may cause a piece of the area being ablated in the polymer to break off and fall into the cavity below. This may result in an unintended obstruction being left in the resulting structure, especially those in which the cavities form a microfluid channel such as jet stacks mentioned above. The piece, referred to here as a chad, may partially or completely block the passage ways through which fluid should flow. The clog causes failures in the printing and manufacturing equipment or faults in the resulting product. In some cases a second laser process can be used to etch layers that are opposite the first etched polymer layer and the cavity. In this case the chad may interfere with the second laser etching process. This issue may arise with materials other than polymers.

SUMMARY

One embodiment consists of a method of forming openings in a polymer layer that includes positioning a layer of a first material over a second material having a cavity such that a portion of the first material lies over the cavity, ablating the portion of the first material over the cavity at a first shape, and ablating the portion of the second material over the cavity at a second shape, wherein the second shape lies within the first shape.

Another embodiment consists of a method forming openings in a polymer layer that includes positioning a layer of a first material over a second material having a cavity such that a portion of the first material lies over the cavity, ablating the portion of the first material over the cavity at a first shape, ablating the portion of the second material over the cavity at a second shape, wherein the second shape lies within the first shape.

DETAILED DESCRIPTION OF THE EMBODIMENTS

Some structures have layers of materials stacked together. For fluidic structures, cavities often exist in the structures to allow the fluid to flow through the structure, such as in ink jet print heads. These cavities are part of the fluid passages that are exposed by ablation of the openings in the layers over the cavities. The laser drilling may cause the formation of 'chads' or 'manhole covers' that fall into the cavity or the fluid passages. These can block the fluid path as well as block the path of a laser beam to process a polymer on the second side of the cavity. While these offer one example of fluidic structures, many other types of structures may benefit from the embodiments discussed here.

Figure 1:
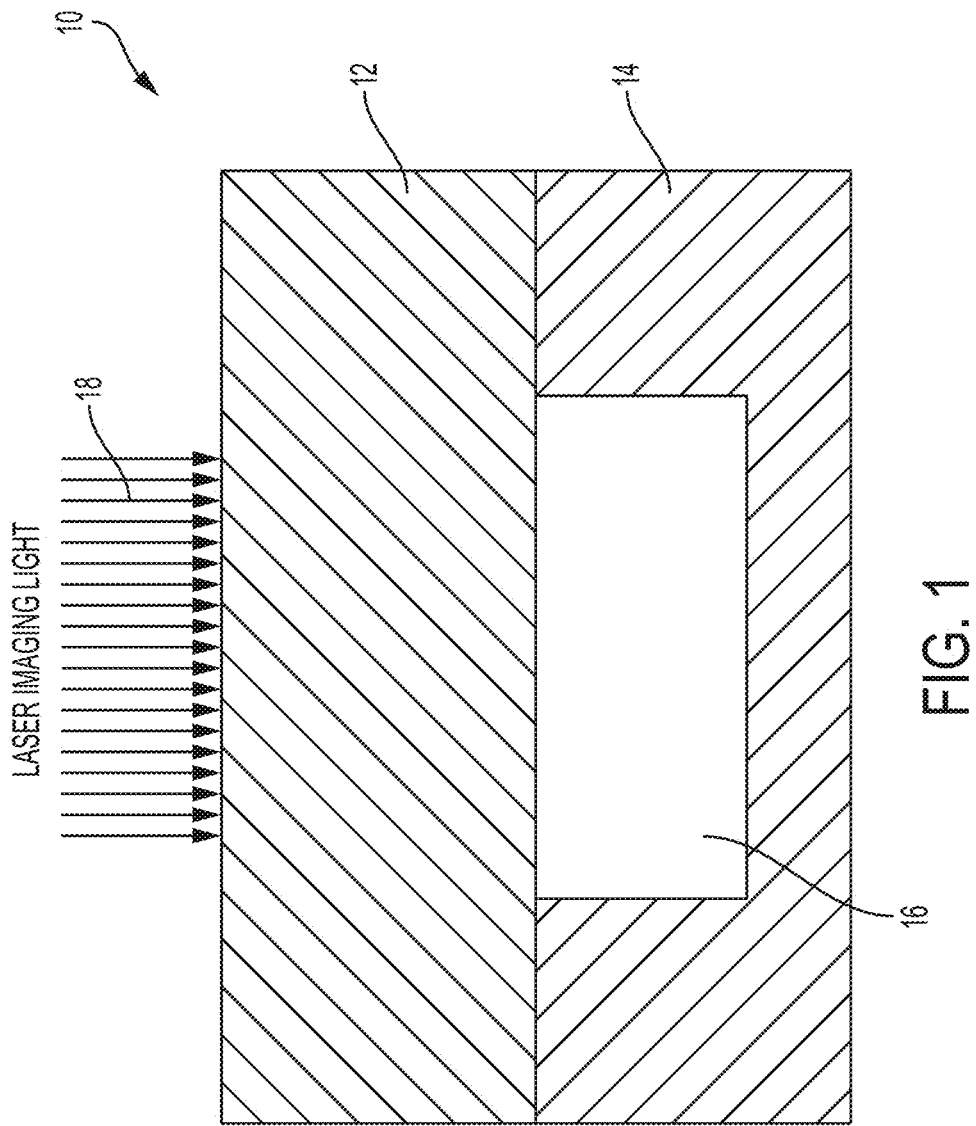
FIG. 1 shows a structure of a first material lying over a cavity.
Figure 2:
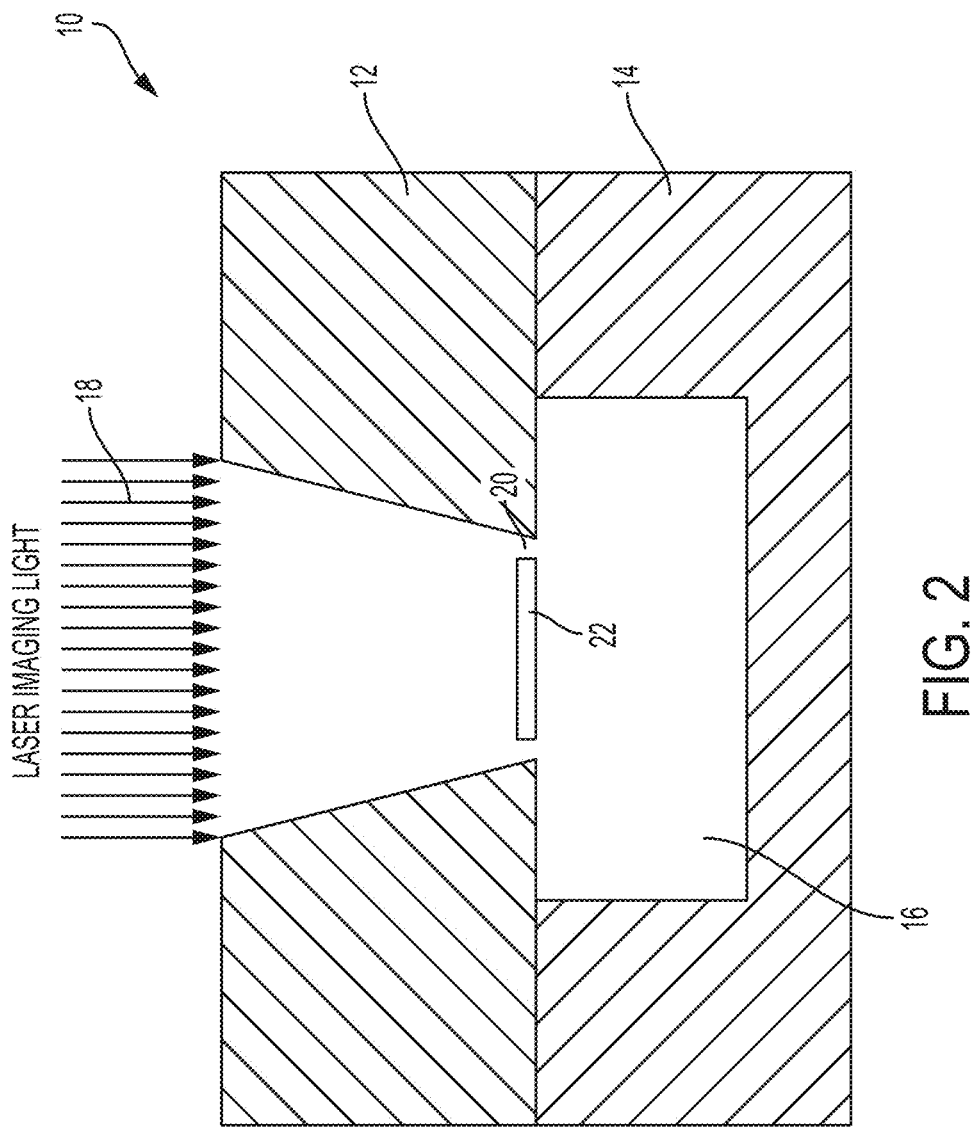
FIG. 2 shows formation of a chad as part of a laser ablation process.

FIGS. 1 and 2 show an example of this problem. In FIG. 1, a fluidic structure 10 has at least two layers, 12 and 14. Layer 14 may be manufactured from stainless steel or other metal. Layer 12 will typically consist of an ablatable material, such as a polymer. In current processes, there is a higher etch rate at the edge of the ablated opening, which may cause the edges of the opening being drilled to ablate faster than in the center. This in turn causes the center portion of the area 22 being left as the laser penetrates the layer at the edges such as 20.

Figure 3:
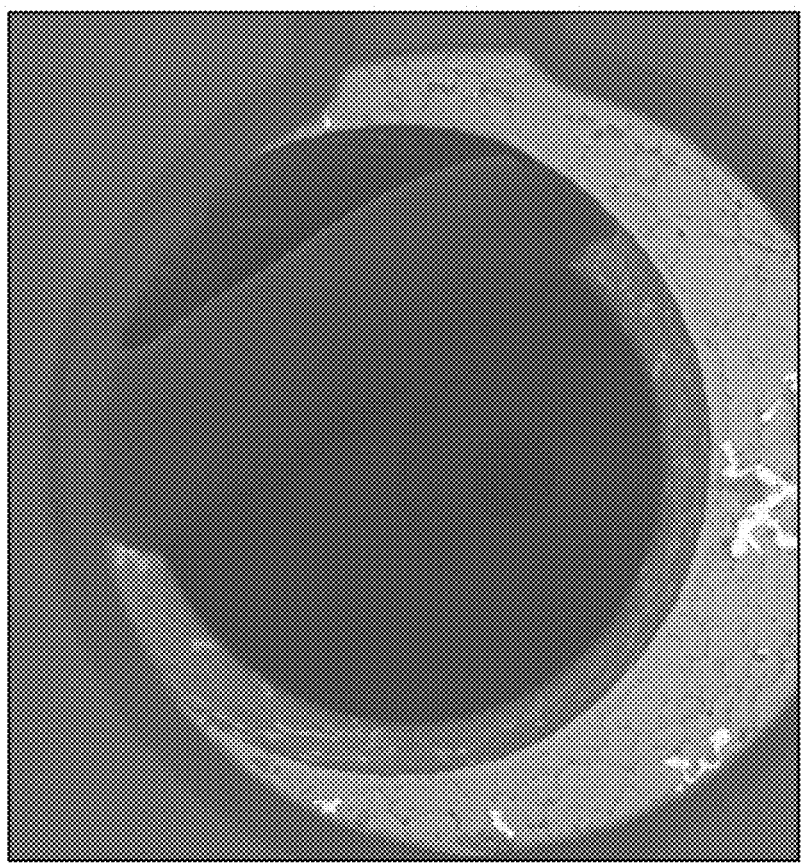
FIG. 3 shows a photograph of a chad in an opening.

This portion 22 may then drop down into the cavity 16. This portion may be referred to as a 'chad.' This chad may create a partial blockage of the fluid path and it can also block the optical path when ablation is to be done on the side of the cavity opposite the first polymer layer. FIG. 3 shows a photograph of the chad in the opening.

Figure 4:
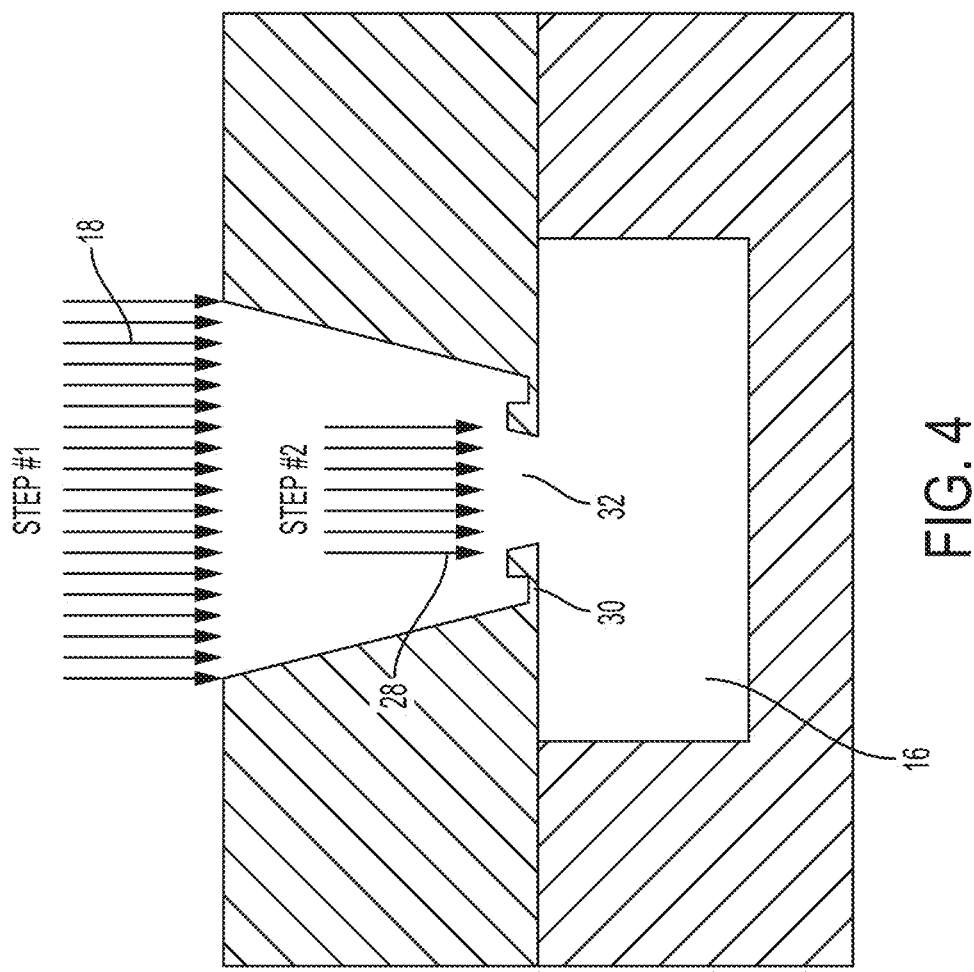
FIG. 4 shows an embodiment of a process to ablate clean openings into layers without support.

It is possible to adjust the process of ablating the polymer layer to avoid creating the chad. FIG. 4 shows an example of this process. Similar to the original process, laser ablation creates the opening 18 in a first procedure. The process stops prior to actually penetrating the ablatable layer at the edges of the laser spot 30. The laser is then applied in a second procedure using a smaller shaped laser spot for the laser light 28.

The smaller shape may be selected to avoid continued etching of the thinner portions of the edges of the first etching step 30. This causes the center portion 32 of the layer to ablate, leaving the edges of the portion still attached, eliminating the occurrence of a chad. In some cases the central portion may not be completely ablated but still be reduced in size sufficiently that it can easily be washed from the cavity.

One should note that the term diameter applies to round or close to round openings. Other shapes are of course possible, including squares and rectangles, with or without rounded corners, or even more complex shapes. A more complex shape for example could be a line leading to a hole or a larger structure, similar to a lollipop. For these shapes the term 'diameter' is not really descriptive. Instead, the discussion may refer to a shape having a contour, such that the second process makes a similar shape having a similar contour but inside the first shape by some offset distance.

Control of the outer contours of the laser spots may occur in many ways. In some laser drilling processes, a laser mask covers the portions of the layers that are not to be ablated. The openings in the laser mask determine the portions that are ablated. In one embodiment, the first procedure uses a laser mask having the wider shape contour. A second diameter laser mask then replaces the first mask and the smaller shaped opening is drilled. The second laser mask may also act to cover the outside edges completely, avoiding possibilities of the thinner edge regions being penetrated and causing a chad.

Figure 5:
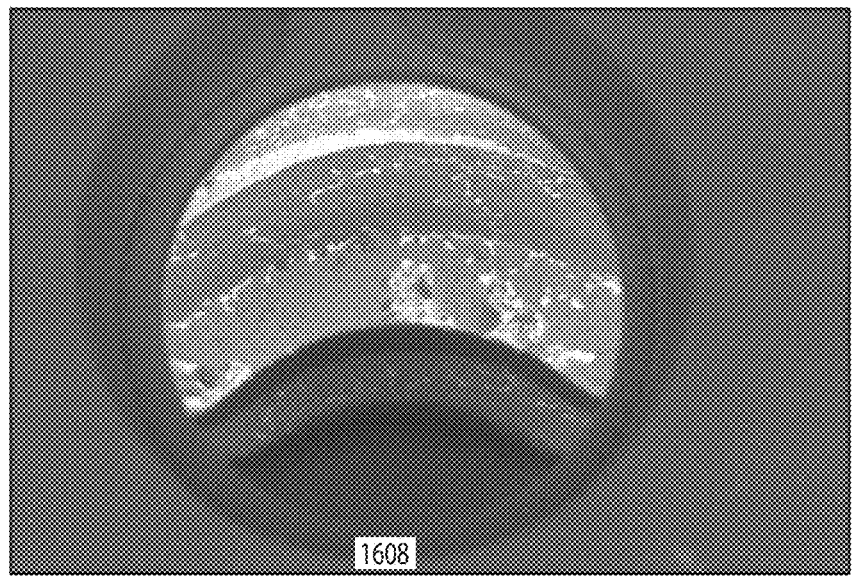
FIG. 5 shows a photograph of a clean opening.

Other possibilities exist to control the laser spot. For example, optical control of the laser spot may adjust the extent of the laser spot used to form each of the openings. Lenses or shutters or other components may control the width of the laser spot for the first procedure. The second procedure would then adjust the size for the second procedure. However, one should note that the required precision and the amount of time for adjustment may render this process too expensive and too time consuming FIG. 5 shows a photograph of a laser drilled opening showing the inner diameter that still has a portion of the ablatable layer extending into the opening. The size of the final opening should take into account the desired shape of the fluid passage before beginning the first procedure. The second, smaller shape inside the first shape is the desired diameter of the fluid passage.

Figure 6:
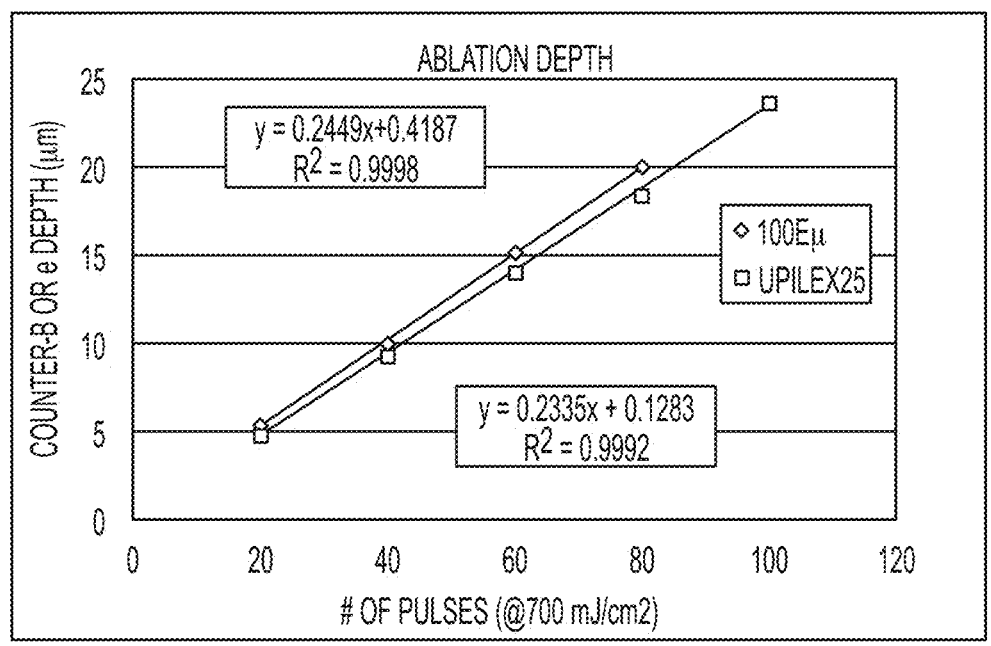
FIG. 6 shows an example of a graph of depth versus number of pulses.

The determination of the shapes of the laser mask and/or the laser spots will be based upon the desired shape of the final hole. However, the power of the laser exposure, and the thickness of the ablatable material will determine for how long the laser ablates at the first shape to avoid completely penetrating the ablatable material. The choice for setting these variables may result from testing. FIG. 6 shows an example of laser power as a number of laser pulses versus the depth of the center bore of a laser for two different materials.

In this manner, a fluidic structure using ablatable material layers can undergo laser drilling without formation of chads. The fluidic structure has cavities that allow fluid flow resulting in unsupported portions of the ablatable layers. The embodiments here ensure that the openings in the ablatable layers over the cavities have the proper shapes but do not create debris that can cause the fluidic structure to fail or cause failure of subsequent laser processing steps.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of forming openings in a layer of a first material of a fluidic structure, comprising:
   positioning the layer of the first material over a second material having a cavity such that a portion of the first material lies over the cavity;
   ablating by laser the portion of the first material over the cavity at a first shape, wherein ablating the portion of the first material at the first shape comprises stopping the ablation prior to the laser penetrating the first material; and
   ablating by laser the portion of the first material over the cavity at a second shape after ablating the portion of the first material over the cavity at the first shape, wherein the second shape is sized for fluid passage, lies within the first shape, and is smaller than the first shape and a part of the portion of the first material ablated at the first shape is not ablated by the second shape.

2. The method of claim 1, wherein ablating the portion of the first material at the first shape comprises using a laser mask having an opening of the first shape.

3. The method of claim 2, wherein ablating the portion of the first material at the second diameter using a laser mask having an opening of the second shape.

4. The method of claim 1, wherein ablating the portion of the first material at a first shape comprises controlling a laser spot optically to cause the laser spot to have the first shape.

5. The method of claim 1, wherein ablating the portion of the first material at the second shape comprises controlling a laser spot optically to cause the laser spot to have the second shape.

6. The method of claim 1, wherein the second shape is smaller than the first shape by a predetermined distance and the predetermined distance depends upon at least one of an energy profile of the laser or a characteristic of the material.

7. The method of claim 1, wherein the first material comprises a polymer.

8. A method of forming openings in a polymer layer, comprising:
   positioning the polymer layer over a material having a cavity such that a portion of the polymer layer lies over the cavity;
   ablating by a laser the portion of the polymer layer over the cavity at a first shape, wherein ablating the portion of the polymer layer at the first shape comprises stopping the ablation prior to the laser penetrating the polymer layer; and
   ablating by a laser the portion of the polymer layer over the cavity at a second shape after ablating the portion of the first material over the cavity at the first shape, wherein the second shape is sized for fluid passage, lies within the first shape, and is smaller than the first shape and a part of the portion of the polymer layer ablated at the first shape is not ablated by the second shape.

9. The method of claim 8, wherein ablating the portion of the polymer layer at the first shape comprises using a laser mask having an opening of the first shape.

10. The method of claim 9, wherein ablating the portion of the polymer layer at the second shape using a laser mask having an opening of the second shape.

11. The method of claim 8, wherein ablating the portion of the polymer layer at the first shape comprises controlling a laser spot optically to cause the laser spot to have the first shape diameter.

12. The method of claim 8, wherein ablating the portion of the polymer layer at a second shape comprises controlling a laser spot optically to cause the laser spot to have the second shape.

13. The method of claim 8, wherein the second shape is smaller than the first shape by a predetermined distance and the predetermined distance depends upon at least one of an energy profile of the laser or a characteristic of the polymer layer.

* * * * *